United States Patent [19]
Pryor

[11] Patent Number: 4,457,584
[45] Date of Patent: Jul. 3, 1984

[54] STEREOSCOPIC VIEWER WITH VARIABLE FIELDS OF VISION

[76] Inventor: Eugene F. Pryor, 5035 Nectar Way, Eugene, Oreg. 97405

[21] Appl. No.: 355,527

[22] Filed: Mar. 8, 1982

[51] Int. Cl.³ .............................................. G02B 27/24
[52] U.S. Cl. .................................... 350/137; 350/143
[58] Field of Search .............. 350/138, 137, 133, 143, 350/131, 130, 145, 146, 139, 140

[56] References Cited

U.S. PATENT DOCUMENTS

| | | | |
|---|---|---|---|
| 366,823 | 7/1887 | Ferry | 350/133 |
| 1,334,480 | 3/1920 | Zimmer | 350/130 |
| 1,743,952 | 1/1930 | Barr et al. | 350/137 |
| 2,295,243 | 9/1942 | Steinman | 350/137 |
| 2,314,174 | 3/1943 | Steinman | 350/130 |
| 2,709,401 | 5/1955 | Jaros | |

FOREIGN PATENT DOCUMENTS

| | | | |
|---|---|---|---|
| 554901 | 1/1931 | Fed. Rep. of Germany | 350/137 |
| 118316 | 9/1957 | U.S.S.R. | 350/138 |
| 443357 | 11/1975 | U.S.S.R. | 350/137 |

Primary Examiner—Jon W. Henry
Attorney, Agent, or Firm—James D. Givnan, Jr.

[57] ABSTRACT

A lightweight stereoscope suitable for wearing on the user's head and including a housing having sight openings in its front and rear walls. Stationary and movable reflectors within the housing permit the user to view spaced apart near or distant images throughout a wide range of divergent or convergent paths. Mirror control means enables synchronized setting of the movable reflectors in a precise manner. Housing structure additionally controls the field of vision by internal partitions and positionable flap members.

8 Claims, 5 Drawing Figures

STEREOSCOPIC VIEWER WITH VARIABLE FIELDS OF VISION

BACKGROUND OF THE INVENTION

The present invention relates generally to stereoscopic viewing devices imparting a three dimensional image to a user.

Briefly, binocular stereoscopic viewing devices function to impart slightly different images to each of the viewer's eyes resulting in the mental image being three dimensional. Early hand held stereoscopic viewers with a separate photograph provided for viewing by each eye were cumbersome and of limited usefulness. More recent efforts have included stereoscopic motion pictures using two interaxially spaced cameras or a single camera with a stereo lens. Colored filters code the separate views and require the viewer to wear glasses each lens of which is a different color to block the image intended for viewing only by the other eye. This system is termed in the art the anaglypic technique. A similar three dimensional system uses polarized lenses in the glasses worn by the viewer where an image for one eye is blocked from viewing by the other eye by a polarizing filter in a lens. A still further stereoscopic system is termed lenticular three dimensional viewing where a screen onto which the moving picture is projected is lenticular to separate the images projected by a "left eye projector" and a "right eye projector".

For certain reasons no one stereoscopic system has been widely or commercially accepted with use to date being more or less on an experimental basis. It is suspected that the added costs of stereoscopic filming and projecting coupled with the tiring effect on the eyes of three dimensional glasses have all discouraged further efforts.

U.S. Pat. No. 946,339 is of interest for the reason it shows a stereoscope capable of providing separate paths of light waves to a viewer's eyes. The prisms used are fixedly mounted in the device. U.S. Pat. No. 366,823 shows a stereoscope having swingably positionable "shutters" to regulate the path of light to each eye. U.S. Pat. No. 2,709,401 discloses laterally adjustable planar mirrors. U.S. Pat. No. 2,845,844 shows pairs of mirrors each pair serving to deflect light waves through 180 degrees to each of the viewer's eyes.

SUMMARY OF THE PRESENT INVENTION

The present invention is embodied in a viewing device wherein the field of vision of each eye may be varied to permit viewing of still or motion picture stereo images throughout a wide range of image sizes.

The device includes a housing of lightweight construction for wearing by the user. Pairs of reflectors in the housing reflect image bearing light waves with means provided for altering the lateral field of view to enable stereoscopic viewing of separate images. Such is true both for photographs in close proximity to the viewer or projected slide and motion picture images viewed from a considerable distance. The reflectors may be in the form of paired planar mirrors with the capability of positioning one mirror of each pair to control the field of view. The housing is preferably equipped with bows or elastic headband for hands free use of the present device.

Important objects include the provision of a binocular stereoscopic viewer of lightweight construction having a set of fixed and adjustable reflectors for each eye of the user permitting virtually unlimited viewing of prints or projected pictures at various sizes and focal distances; the provision of such a viewer requiring no lenses and which may be used with or without the user's eyeglasses; the provision of a viewer which does not diminish details or the brilliance of viewed pictures; the provision of a stereoscopic viewer which avoids straining of the user's eyes, a defect common to known three dimensional systems; the provision of a viewer lending itself to low cost manufacture yet suitable for photograph, television, projected slide or moving picture viewing of separate stereo images.

BRIEF DESCRIPTION OF THE DRAWINGS

In the accompanying drawings

DETAILED DESCRIPTION OF THE PREFERRED EMBODIMENT

Figure 1:
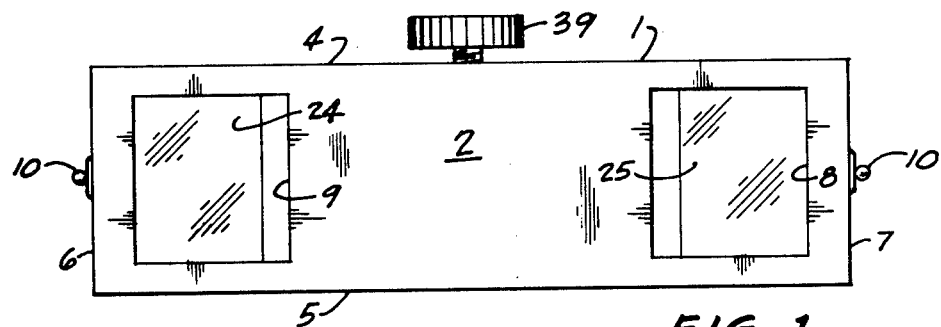
FIG. 1 is a front elevational view of the present viewer.
Figure 2:
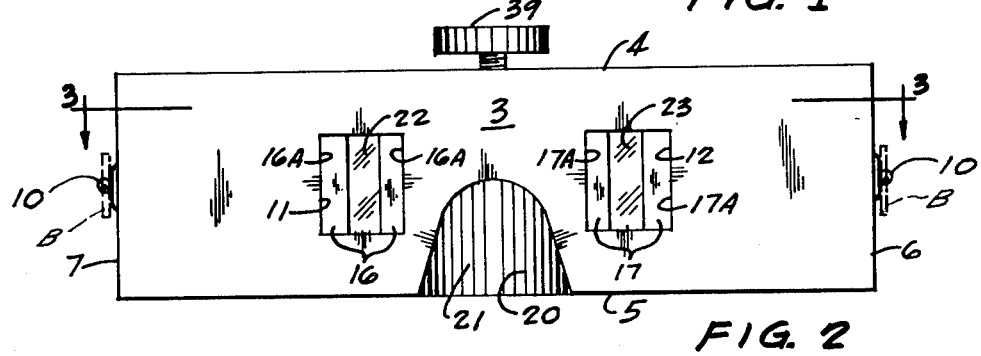
FIG. 2 is a rear elevational view thereof.

With continuing reference to the drawing wherein applied reference numerals identify parts hereinafter similarly identified, the reference numeral 1 indicates the main elongate body or housing of the present viewing device.

Said body comprises a front wall 2 which, during viewer use, is away from the user's face and a back wall 3 which is proximate the user's face. Top and bottom walls are at 4 and 5 while end walls are at 6 and 7. Head attachment means such as an elastic band B are attachable at 10 to body 1.

Figure 3:
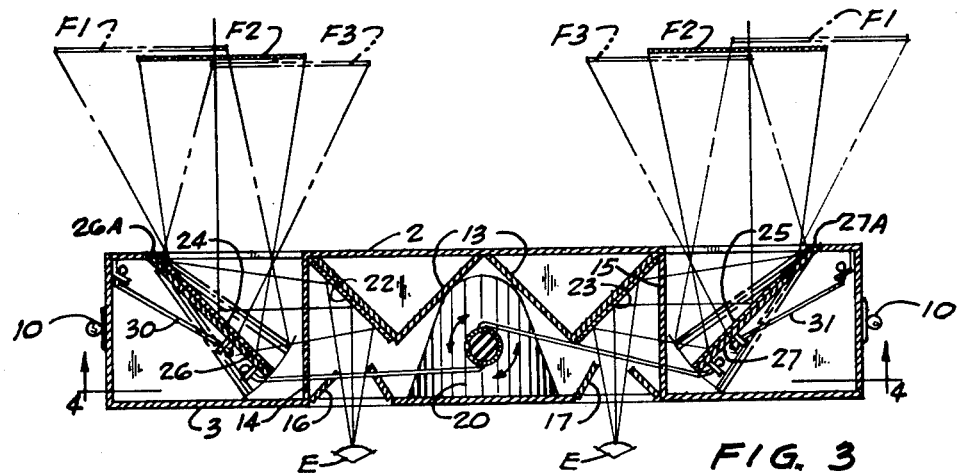
FIG. 3 is a horizontal sectional view taken downwardly along line 3—3 of FIG. 2.
Figure 4:
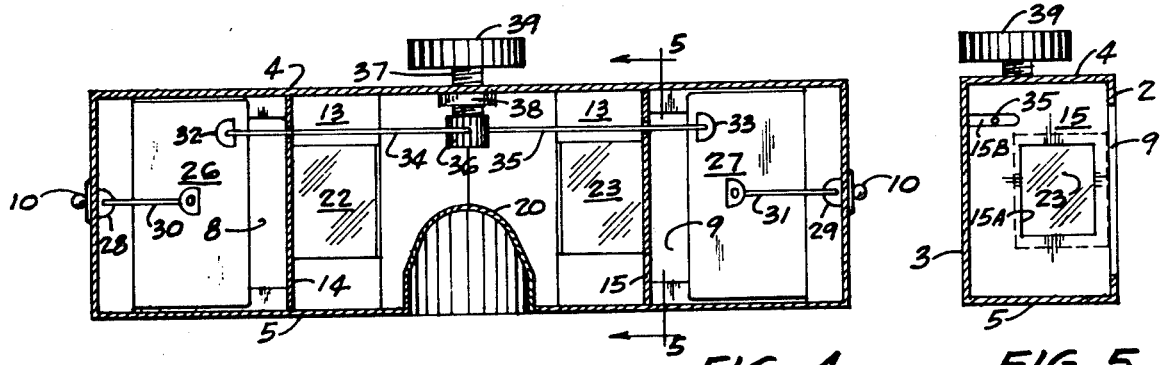
FIG. 4 is a vertical sectional view thereof taken approximately along line 4—4 of FIG. 3.

Two separate paths of light waves pass through the body of the device toward the viewer's eyes shown symbolically in FIG. 3 at E. Front wall openings at 8 and 9 admit light waves to the housing interior while back wall openings at 11 and 12 permit reflected light to be directed toward the user's eyes. To provide for variances in interocular distances, as between individual users of the device, flaps at 16 and 17 may be positioned to provide variable sight openings. Such positioning may be provided by hinge areas on the flaps at 16A and 17A. Flaps 16 and 17 also function to limit the field of vision.

Figure 5:
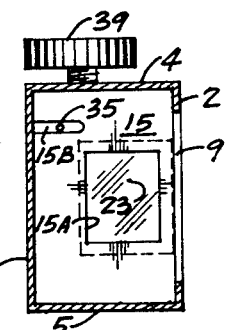
FIG. 5 is a vertical sectional view thereof taken along line 5—5 of FIG. 4.

Internal structure of the housing includes upright support structure at 13 on which a later described pair of fixed reflectors are positioned. Extending crosswise of the housing are sight frames or masks at 14-15 each defining a sight opening as a 15A in FIG. 5. Each frame is slotted as at 15B to permit passage of a later described mirror control member.

An inclined, curved wall at 20 defines a nose receiving well or recessed area at 21.

A reflector system, best viewed in FIG. 3, provides a positionable field of vision for each eye and for ease of manufacture may utilize a first or fixed pair of planar mirrors at 22 and 23 each of which cooperates respectively with second or positionable pair of mirrors at 24 and 25 to provide separate pathways for light wave travel to each eye of the viewer. Mirrors 24 and 25 are swingably carried by plates 26 and 27 each hingedly mounted at 26A and 27A to housing front wall 2. Suitable housing material such as a resinous plastic may permit the hinge components to be inexpensively formed as by scoring or the like at the intersection of the plates and the front wall.

For synchronized positioning of the pair of movable mirrors 24 and 25, I provide a mirror control means including elastic or resilient biasing members 30 and 31 biasing plates 26-27 and the mirrors thereon toward their respective ends of the housing. Tabs 28 and 29 integral with the housing end walls and the plates receive the ends of the elastic biasing members. Additional tabs 32-33 on the mirror carrying plates secure the ends of other tensionable members at 34 and 35 the opposite ends of which are wound about a rotatable drum 36 on a control knob 39. Drum 36 and its shaft 37 are sleeve mounted at 38 in the housing top wall with drag imparted to the drum by the sleeve threads to counteract the biasing action of elastic members 30 and 31 thereby permitting selective setting of the movable mirrors. Typical fields of vision at F1, F2 and F3 are shown in FIG. 3 which fields are achieved by positioning of movable mirrors 24 and 25.

The viewer may be constructed from lightweight synthetic materials to provide a low manufactured cost and a viewer highly suitable for temporary attachment to the head of a user without discomfort. The viewer may be adjusted to view pairs of small images (photos, slides, etc.,) located forwardly adjacent housing 1 or conversely pairs of images, of much greater size, spaced several feet from the device. The latter mentioned images may be of the video or projected type. The mirror control means permits a wide range of spaced apart image viewing by reason of the reflectors and the precise mirror control system therefor allowing widely divergent or convergent optical paths.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

I claim:

1. A stereoscope for viewing spaced apart stereo photographic images and comprising in combination, a main body including a housing including a front wall and a rear wall defining respectively a pair of front wall sight openings and a pair of rear wall sight openings, a first pair of reflectors within said housing, a second pair of reflectors within said housing each reflector of said second pair hingedly mounted within said housing, the pairs of reflectors orientated to reflect light waves along separate paths toward a user's eyes located proximate said rear wall sight openings, and mirror control means coupled to the hingedly mounted pair of mirrors whereby the field of vision of each eye of the viewer may be altered to permit viewing of stereo images throughout a range of spaced apart distances and throughout a wide range of image sizes spaced forwardly at random distances from the stereoscope, said control means further including biasing members of a resilient nature coupled to the main body and to said hingedly mounted pair of mirrors to individually bias same in a first direction, said control means further including tensionable members also coupled to said hingedly mounted pair of mirrors, a control member for manipulation by the user and acting on said tensionable members to impart movement to same to bias the hingedly mounted mirrors coupled thereto in a second or opposite direction.

2. The stereoscope claimed in claim 1 additionally including attachment means for attaching the main body to the user's head.

3. The stereoscope claimed in claim 2 wherein said main body additionally includes internal sight frames blocking a portion of the light waves from the user's eyes.

4. The stereoscope claimed in claim 2 wherein said main body additionally includes flaps partially defining rear wall sight openings to block portions of light waves from the user's eyes.

5. The stereoscope claimed in claim 4 wherein said flaps are adjustably mounted on said main body.

6. The stereoscope claimed in claim 1 additionally including sleeve means within which said control member is journaled with said sleeve means imparting frictional resistance to control member movement whereby the control member and the hingedly mounted pair of mirrors will retain their position upon release of the control member.

7. The stereoscope claimed in claim 6 wherein said control member and said sleeve means are in mutual threaded engagement.

8. The stereoscope claimed in claim 1 wherein said hingedly mounted pair of reflectors are mounted to the front wall of said main body and reflect light waves toward the remaining pair of reflectors located forwardly of rear wall sight opening.

* * * * *